US010579705B1

(12) United States Patent
Derickson

(10) Patent No.: US 10,579,705 B1
(45) Date of Patent: Mar. 3, 2020

(54) ENERGY DESIGN AND RATING SYSTEM FOR BUILDINGS

(71) Applicant: WWTemplar LLC, Wilmington, DE (US)

(72) Inventor: Russell G. Derickson, Broomfield, CO (US)

(73) Assignee: LGHorizon, LLC, Denver, CO (US)

(*) Notice: Subject to any disclaimer, the term of this patent is extended or adjusted under 35 U.S.C. 154(b) by 390 days.

(21) Appl. No.: 15/444,282

(22) Filed: Feb. 27, 2017

Related U.S. Application Data

(60) Provisional application No. 62/300,738, filed on Feb. 26, 2016.

(51) Int. Cl.
| | | |
|---|---|---|
| *G01K 17/00* | (2006.01) |
| *G06F 17/18* | (2006.01) |
| *G06F 1/3203* | (2019.01) |
| *G06F 17/50* | (2006.01) |

(52) U.S. Cl.
CPC .......... *G06F 17/18* (2013.01); *G01K 17/00* (2013.01); *G06F 1/3203* (2013.01); *G06F 17/5009* (2013.01); *G06F 2217/78* (2013.01)

(58) Field of Classification Search
CPC .... G06F 17/18; G06F 1/3203; G06F 17/5009; G06F 2217/78; G01K 17/00
USPC ........................................................ 702/136
See application file for complete search history.

(56) References Cited

U.S. PATENT DOCUMENTS

| | | | |
|---|---|---|---|
| 10,339,232 B1* | 7/2019 | Hoff ..................... | G06F 17/5009 |
| 2012/0065783 A1* | 3/2012 | Fadell ................ | G05D 23/1917 |
| | | | 700/276 |
| 2015/0192911 A1* | 7/2015 | Sloop ..................... | G05B 15/02 |
| | | | 700/291 |
| 2015/0330923 A1* | 11/2015 | Smullin ................ | G01N 25/20 |
| | | | 702/136 |

* cited by examiner

*Primary Examiner* — Toan M Le
*Assistant Examiner* — Xiuqin Sun
(74) *Attorney, Agent, or Firm* — Fish & Richardson P.C.

(57) ABSTRACT

This document generally describes computer-based technology related to energy design and rating systems for buildings. For example, a computer-based energy design and rating system can provide a fast and accurate method for calculating the energy performance and thermal comfort of residential and light commercial buildings.

18 Claims, 7 Drawing Sheets

ENERGY DESIGN AND RATING SYSTEM FOR BUILDINGS

CROSS-REFERENCE TO RELATED APPLICATIONS

This application claims the benefit of priority to U.S. Provisional Application Ser. No. 62/300,738, filed Feb. 26, 2016, entitled ENERGY RATING SYSTEM FOR BUILDINGS, the entire contents of which are hereby incorporated by reference.

TECHNICAL FIELD

This document generally describes computer-based technology related to energy design and rating systems for buildings.

BACKGROUND

Building energy ratings can be provided as an indication of comparative energy performance. For example, a building energy rating may pertain to energy use for space heating and cooling, water heating, ventilation, appliances, and lighting calculated on the basis of a reference building of equal size. Techniques for calculating energy ratings of new or existing buildings may vary across various jurisdictions, and, in conjunction with auditing procedures, may be used to monitor and improve building energy efficiency of existing buildings. The same techniques also can be used in the design, not just the rating, of energy efficient new buildings. It can be prudent to properly integrate the design and rating of new buildings, a process frequently missed currently.

SUMMARY

This document generally describes computer-based technology related to energy design and rating systems for buildings, new and retrofit. For example, a computer-based energy design and rating system can provide a fast and accurate method for calculating the energy performance and thermal comfort of residential and light commercial buildings. Energy design and rating systems can serve a variety of purposes, such as the design of new buildings and the retrofit of existing ones for enhanced energy performance in comparison to current building stock. Energy design and rating systems can also perform a sequence of daily energy balance heating and cooling equations, as appropriate depending on day to day climate parameters, for each day of the year in a coupled fashion using climate data for a standardized typical year, with: a) supporting sub-hourly based numerical algorithms to capture internal temperature histories for room air and the intrinsic internal thermal mass embodied in wall, ceiling, and floor elements, as well as furnishings; b) pre-calculated correlational curve fits derived from a complex, complementary numerical model that operates at numerical times steps of 5 to 15 seconds to capture the cycling behavior of various types of mechanical heating and cooling equipment; and c) closed-form mathematical analytics for certain aspects of energy performance such as thermostatic setback for energy savings. These elements may be combined to provide high levels of accuracy and speed compared to current numerical models for calculating building energy performance, and additionally to more accurately account for weather variations from day to day (e.g., cold one day requiring heating and warm the next day requiring cooling) and the internal thermal mass of a building (e.g., thermal "memory" of the building) that can work for or against such day to day contrasts. Such techniques can provide refined capability through the computer models to achieve balanced design between the heating and cooling seasons in terms of the building components (e.g. insulation levels, window characteristics, HVAC systems, etc.) and control mechanisms (e.g. controllable window shadings or insulation, venting systems, etc.). For example, windows can enhance passive solar gains in winter to offset heating loads which can also lead to undesired increases in summer cooling loads. The technology described throughout this document can account for such impacts on cooling and heating for a building.

Computer-based techniques for calculating building energy performance can include, for example, incorporating a set of unique, coupled, simultaneous recursion equations for room air and intrinsic thermal mass that are mathematically "second order" in formal accuracy, with no computational time lag and minimal operation count, but that perform better than higher order numerical methods. Among other advantages, the simultaneous recursion algorithms (which are termed "implicit" in numerical algorithm parlance) may allow for larger time steps, hence greater computational efficiency with little to no loss in accuracy compared to "explicit" numerical methods of formal higher order. For example, the algorithms can operate well with 30 minute time steps, whereas an "explicit" algorithm may use 15 minute time steps, or shorter, to achieve comparable accuracy. A contributing factor to the effectiveness and computational efficiency of the "implicit" recursion equations is that their governing coefficients can be predetermined from a rather complex set of mathematical formulae that are calculated only once at the beginning of each simulated year. Thus, as a building is parametrically changed iteratively in a design process as various building elements of differing characteristics are explored for each simulated year, the overall computational expenditure can be minimal. Through interpolative and analytic methods, sub-hourly information can be captured on the order of 10-15 minutes for room air temperature and thermal mass temperature despite utilizing a time step of 30 minutes in the algorithms, which may be beneficial for capturing time of use (TOU) energy performance, including peak energy demand. Cycling losses and general behavior of mechanical heating and cooling equipment can be captured at 5-15 second resolution by correlating, for example, half hour-based or hourly-based climate parameters and building characteristics.

Any of a variety of appropriate sensors, devices, systems, apparatuses, heat/cooling equipment, computing devices, and/or communication networks can used to capture thermal and energy performance information, such as room air temperature, thermal mass temperature, HVAC cycles, blower speeds, duct heating and cooling losses, and/or other appropriate information.

The computer-based energy design and rating system can calculate essentially all of the features of more complex models for residential and light commercial buildings, often more accurately, but at a fraction of the computational time used by the more complex models. Examples may include time of use (TOU) energy consumption, relevant to peak energy costs, and/or general time of use utility energy pricing. The energy design and rating system can also model advances in building technology components such as mini-split heat pumps, dynamic glazing, automated window shading, advanced heat recovery ventilation devices, and battery storage for photovoltaic (PV) panels at a level equal to more complex, computationally intensive models. Such models and techniques can be used to improve building design to enhance the performance and efficiency of building technology components.

The computer-based energy design and rating system's usefulness, among other aspects, can include helping architects and designers, who may be unfamiliar with energy modeling, to perform multiple, iterative calculations central to the design process, which typically requires several trial and error steps to arrive at a viable completed design. The energy design and rating system's modular software architecture and reporting features can minimize such trial and error techniques to improve energy efficiency by instead providing instant feedback at each iteration to quickly evaluate and compare a broad range of possible variation in building components to arrive at a solution with optimized whole-building efficiency. Additionally, energy design and rating systems can dynamically incorporate state-of-the-art building technology components as they come into the market, so that they can be suggested and tested in design iterations as possible solutions.

In one implementation, a computer-implemented method for determining an energy consumption metric for a building includes: accessing, by a computer system, thermal information for the building obtained from a collection of sensors and heating and cooling equipment located in and around the building; determining, by a computer system and based, at least in part, on the thermal information, (i) a total building load coefficient for the building, (ii) a periodic average inside temperature for the building, (iii) a periodic average outdoor temperature for the building, (iv) total heat gains into the building over a period of time, (v) energy loss from venting over the period of time, (vi) a difference in thermal storage in intrinsic thermal mass of the building from a beginning to an end of the period of time, (vii) an excess stored energy available from a previous period of time, (viii) energy losses associated with delivering heat and cooling from heating and cooling equipment in the building (ix) energy losses associated with cycling of the heating and cooling equipment, and (x) steady state efficiency of the heating and cooling equipment; determining, by the computer system, the energy consumption metric for the building based on a combination of (i) the total building load coefficient for the building, (ii) the periodic average inside temperature for the building, (iii) the periodic average outdoor temperature for the building, (iv) the total heat gains into the building over the period of time, (v) the energy loss from venting over the period of time, (vi) the difference in thermal storage in intrinsic thermal mass of the building from a beginning to an end of the period of time, (vii) the excess stored energy available from a previous period of time, (viii) the energy losses associated with delivering heat and cooling from heating and cooling equipment in the building (ix) the energy losses associated with cycling of the heating and cooling equipment, and (x) the steady state efficiency of the heating and cooling equipment; and outputting, by the computer system and in a user interface, the energy consumption metric for the building.

Other features, objects, and advantages of the technology described in this document will be apparent from the description and the drawings, and from the claims.

BRIEF DESCRIPTION OF THE DRAWINGS

Like reference symbols in the various drawings indicate like elements.

DETAILED DESCRIPTION

Figure 1:
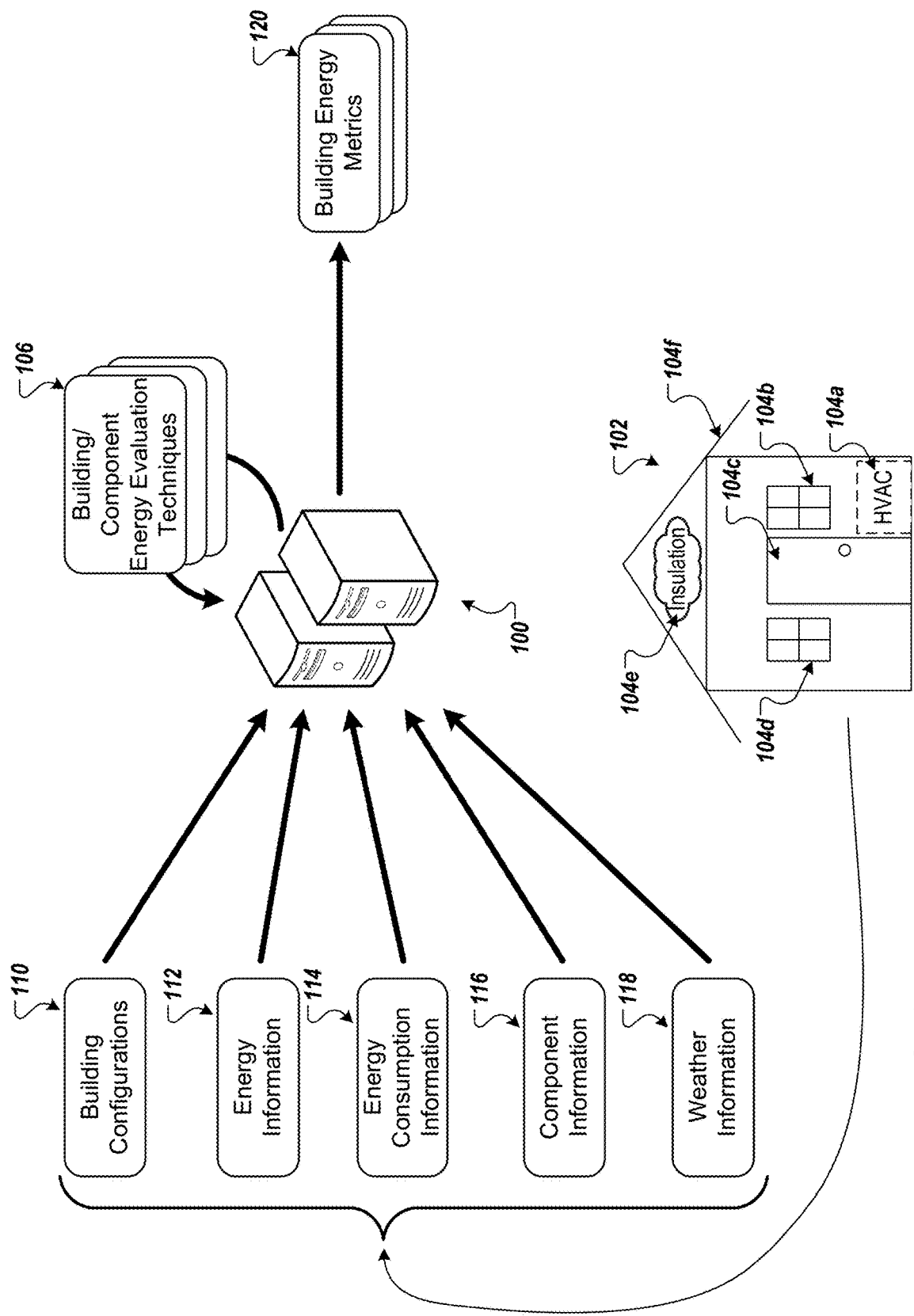
FIG. 1 depicts an example computer system that can be used to perform energy designs and ratings for buildings.

FIG. 1 depicts an example computer system 100 that can be used to perform energy designs and ratings for buildings 102 (e.g., homes, office buildings) and/or the actual components 104 installed within a building 102 (e.g., particular HVAC components, types of insulation, windows, doors, roofing). Computer-implemented techniques 106 can use information describing building configurations 110 (e.g., the blueprints of a building), energy information 112 (e.g., energy inspection/audit reports), energy consumption information 114 (e.g., energy bills, building component energy consumption information)), component information 116 (e.g., make/model of component, location where installed, energy rating, warranty information, maintenance data), and/or weather information 118 (e.g., historical weather patterns and trends for the building 102, aspect/orientation of the building 102, surrounding structures/foliage that may affect solar load) to determine one or more energy metrics 120 (e.g., energy rating, energy efficiency, energy conservation improvement rating) for the building 102 and/or components 104 within the building 102.

Such energy metrics 120 can additionally be combined with various systems, techniques, and/or user interfaces, such as through providing an energy efficiency/rating metric with real estate listings as part of a building data and/or real estate system. For instance, a user interface can include an energy rating for a property 102 (e.g., overall energy rating for the property, building's energy efficiency when compared to energy efficiency if building were constructed to minimum permitted level of energy efficiency (e.g., code for building), comparison of energy efficiency relative to other similar buildings in surrounding area), along with energy ratings for specific components 104 that are listed (e.g., projected energy ratings for the components, actual energy efficiency of the components), and energy ratings 120 for particular maintenance (e.g., maintenance installing component with better/worse energy efficiency, results of maintenance on energy efficiency).

Such energy rating information 120 can be provided in real time to building owners/tenants, energy companies, and/or other interested/permitted parties (e.g., third parties who are granted permission to view energy information for a building, such as realtors and potential purchasers for a building with a real estate listing). For example, an energy company can use the energy information 120 to determine energy rebate amounts that can be claimed across a range of buildings that are serviced by the energy company.

For instance, a streamlined, computer-implemented process 106 can be provided that will extend from the blueprints of a building (example of 110), to the quality of the home (example of 112), to the energy consumption including warranty and maintenance data (example of 114), and providing productive ways to extend those savings to grow for the consumer (e.g., providing insights into energy efficient components and/or behaviors to improve energy conservation). Quantifiable, energy-related measurements 120 can be generated for buildings, which can help people more readily assess initial building costs as well as the quality in which these buildings are constructed.

In one example implementation, plans for the building 102 can be used (e.g., building information from the systems, techniques, and user interfaces) with the system 100 that would allow design and rating systems to be measured with little to no error in not only measuring energy, but the quality of the craftsmanship of the building itself. For instance, when a user purchases a home, the user can be given a report of everything including estimated energy usage for the home, along with a system that would notify the user of service and maintenance in order to keep everything in top working condition. Such a system may be comprehensive in terms of its background data, which can be obtained from multiple different sources (e.g., home builders, servicemen, energy inspectors, real estate agents, users) to provide a full collection of every piece of data for a home from the initial blueprint, to the creation of the home, every inspection carried out including how far above code the home has been created, and every service or maintenance carried out, which can improve the way the home is valued by providing users with quality information (e.g., component ratings, maintenance ratings, energy ratings) that goes beyond simply the number beds/baths and the square footage.

For instance, instead of basing the quality of a home (example building 102) on just a few inspections which complete at the final signature at the closing of a home, a better and updated reporting of home/building information can be provided to users to better inform the users of a variety of details that may not be otherwise readily available. For example, maintenance and/or service information (example of information 110-118) can be provided to consumers to highlight the impact of proper service (e.g., HVAC maintenance service) having been performed on the home, which may provide improved energy efficiencies for the home, and/or the impact of proper service not having been performed on various aspects of the home, which may result in energy inefficiencies over the life of the home. Users can be provided with information regarding the difference in energy consumption over periods of time (e.g., life of the home, next year, next five years) based on whether proper service is continued throughout the life of the home, in addition to other variations that can affect energy efficiency, such as weather and occupant behavior.

A variety of advantages can be provided from such energy related features, such as an increase in productivity including actuality rates, behavioral modification, as well as real-time notification regarding energy information (e.g., consumption, savings, ratings) for builders, realtors, inspectors, as well as consumers. A variety of additional/alternative features can be included with such energy-related features, such as home data collection; creating customized solution designs to minimize reporting errors and maximize a quality output; developing test plans, test scripts, and test cases; determining project completion; assessing project success; determining energy loss and savings; analysis to consult better savings; home valuation processing based on any of a variety of factors (e.g., energy-related factors, maintenance-related factors, component quality-related factors); integrated format for which all bookkeeping will be simplified; or any combination thereof. Such features can be incorporated into one or more systems, such as the system 100 described above and/or other systems, which can allow tasks such as: schedule rating job visits; achieve documents, images & various data; track progress; consolidate reports; provide service history; warranty scheduling and maintenance; data report for use for show the quality of the home; or any combination thereof.

An example system 100 can include a front-end to serve content for presentation on client devices, such as in user interfaces providing energy design and rating information for the building 102. The system 100 can additionally and/or alternatively include a back-end for an energy design and rating system that can include hardware and/or software components that can perform, for example, heating and/or cooling balance calculations. As is described in further detail below, various elements may be calculated on annual, monthly, weekly, daily, hourly and sub-hourly time scales.

Figure 2:
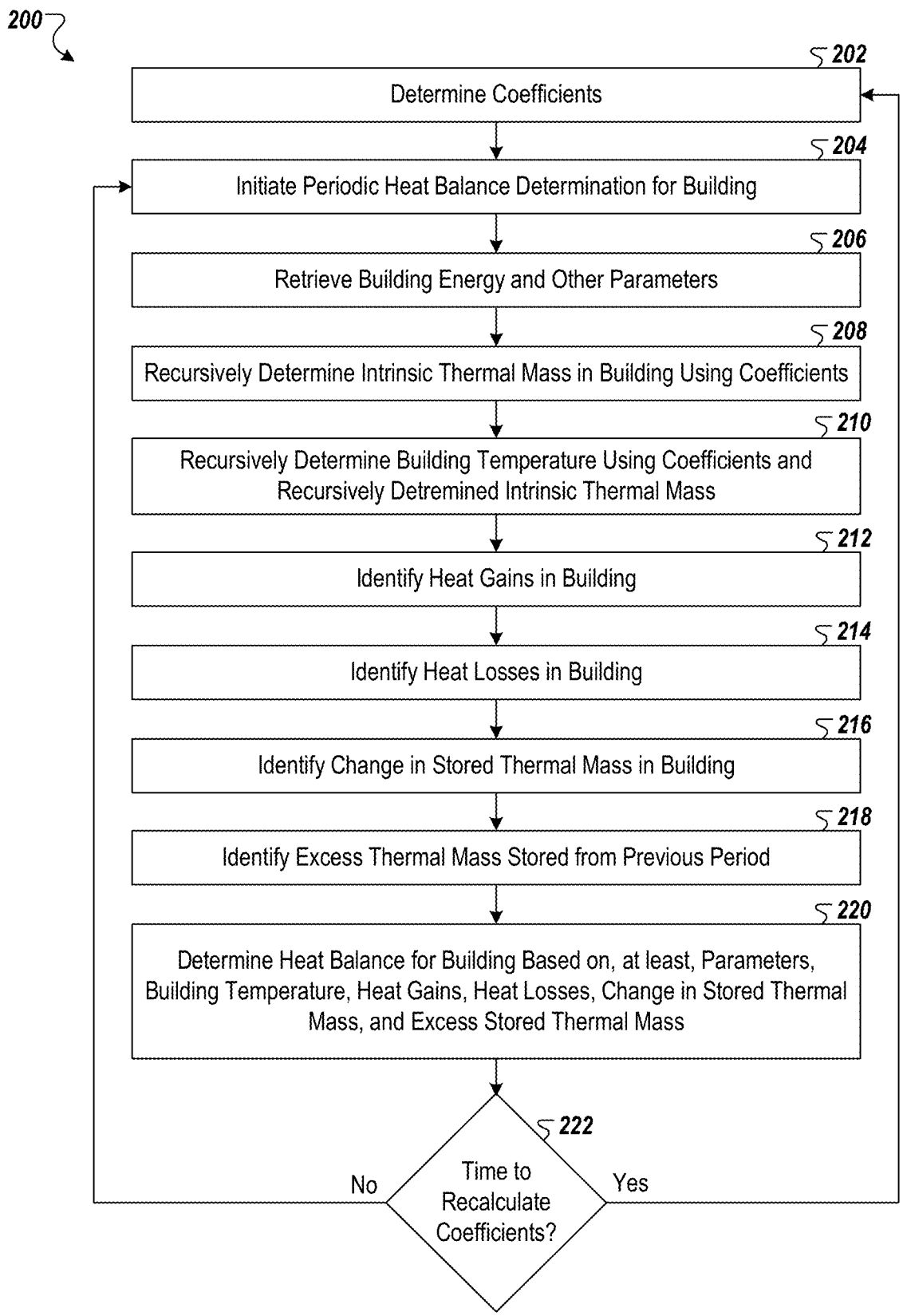
FIG. 2 is a flowchart of an example technique for determining a periodic heating balance for a building.

FIG. 2 depicts a flowchart of an example technique 200 for determining a periodic heating balance for a building. The example technique 200 can be performed by the system 100, and can be performed, for example, as a simulation over a period of time, such as over a single day for relevant individual "design" days (heating or cooling), extreme weeks of climate, annual simulations, and/or any chosen time frame or circumstance. The period of time over which the technique 200 can determine the heating balance for a building can range from less than a day (e.g., 1 hour, 2 hours, 6 hours, 12 hours), daily, multiple days, a week, multiple weeks, a month, multiple months, a year, multiple years, and/or others.

The technique 200 can account for thermal linkages between time periods (e.g., linkages between days), which can depend on, for example, the amount of thermal mass in a building and the amount of solar gains that thermally charge the mass in heating or cooling scenarios. The technique 200 can account for the remaining thermal storage at the end of one day, which can serve the heating needs or compound the cooling needs of the subsequent day. For example, the intrinsic mass of a building (e.g., that which is embodied in the sheetrock walls and various furnishing elements) can be initially modeled, and then additional mass can be modeled, such as interior masonry walls and exposed masonry floors, and phase change wall and ceiling materials. The technique 200 can take into consideration of variety of factors, such as space heating and cooling, energy use due to household appliances, hot water heating, domestic water usage, and lighting, which depend on the number of occupants in a home and not the building elements that affect heating or cooling.

Accurately accounting for heat storage over periods of time (e.g., between days), including the intrinsic thermal storage of a building, can be computationally intensive. For example, differential equations [2a]-[2b] (described below) can be used to model the heat linkage over time periods for a building, but may use significant computational resources (e.g., use large number of CPU cycles, use large amount of memory) that may prohibit their use in real time. In contrast, the example technique 200 accounts for heat storage and linkages between time periods in a way that is less computationally intensive and that uses fewer computational resources (e.g., use fewer CPU cycles, use less memory) so as to permit, for example, use of the technique 200 in real time. For example, the technique 200 can determine coefficients on a second periodic basis (e.g., annually) that is longer than a first period (e.g., daily) for determining the periodic heating balance for a building. The coefficients can be computed, stored, and then repeatedly used in recursive equations (e.g., equations [3a]-[3b]) during the longer period of time to approximate heat linkages within a building, yet while still providing results that are substantially as accurate as the calculations performed without approximation (e.g., differential equations [2a]-[2b]). By using the technique 200, heating balances for a building can be efficiently and accurately simulated, which can provide any of a variety of advantages. For example, such efficient and accurate techniques can permit periodic heating balances to be determined more frequently (e.g., determined on a daily basis instead of annually) and to be used in a variety of non-conventional computing platforms and contexts, such as being used for real time calculations by a server system (e.g., cloud based server system) in response to client requests for such calculations.

Coefficients can be initially determined (202) and then repeatedly used without recalculation during simulations to determine periodic heating balances for a building. For example, coefficients can be determined annually for a building and then used throughout the year to approximate heating balances for the building. Coefficients can be determined for use in recursive equations that can approximate and model heating balances and linkages across periods of time (e.g., approximate stored intrinsic mass). Example coefficients and recursive equations are described below with regard to equations [3a]-[3b]. Such approximations can be highly accurate and can be substantially the same as non-approximated calculations, for example, determined using example differential equations [2a]-[2b].

A periodic heating balance determination for the building can be initiated (204). The periodic heating balance for the building can be determined across any of a variety of periods of time, such as 1 hour, 6 hours, 12 hours, 1 day, 2 days, 3 days, 1 week, 1 month, and/or other periods of time. For example, the periodic heating balance can be a daily heating balance that is determined using the following equation:

$$Q_H = \{24(UA)_{tot} \times (T_{rm,avg} - T_{amb,avg}) - S^* V_H + \text{Stor1}\} / \eta_{ss} + L_{cycling} + E_{fan} - \text{Stor2} \quad [1]$$

in which:
  $Q_H$ is the daily energy consumption for heating;
  $(UA)_{tot}$ is the total building load coefficient;
  $T_{rm,avg}$ is the daily average room temperature;
  $T_{amb,avg}$ is the daily average ambient (outdoor) temperature;
  $S^*$ is the total daily heat gains into the building (e.g., including solar gains through windows, solar gains through walls and roof as a function of exterior color, hence ability to absorb heat, and internal gains due to appliances and people);
  $V_H$ is energy loss from venting to minimize or prevent wintertime room temperature overheating due to solar gains;
  Stor1 is the difference in thermal storage in thermal mass from the beginning to end of a day;
  Stor2 is the excess of stored energy available from the previous day to offset the heating load of the current day;
  $E_{fan}$ represents energy losses associated with fan power to deliver heat to the room space;
  $L_{cycling}$ represents energy losses associated with HVAC equipment cycling; and
  $\eta_{ss}$ is the steady state efficiency of the HVAC equipment (COP will apply to certain devices).

As part of determining the periodic energy consumption for heating (e.g., daily energy consumption for heating—$Q_H$), building energy and other parameters (e.g., weather parameters) can be retrieved (206), such as the total building load coefficient ($(UA)_{tot}$), the steady state efficiency of the HVAC equipment ($\eta_{ss}$), and the ambient weather ($T_{amb}$). For example, the parameter $(UA)_{tot}$ can be computed using the UA of each envelop element of the building. Envelop elements can be selected inputs by the user to represent composite thermal insulation values for walls, the roof, foundation, windows, infiltration (air leakage), and so forth. The parameter $\eta_{ss}$ (or COP) can be specified for each particular HVAC mechanical equipment device. The parameter $T_{amb}$ can be determined from weather data.

Using the coefficients previously determined for a longer period of time (e.g., determined for annual simulations), the temperature of the intrinsic thermal mass in the building for the time period at issue (e.g., daily energy consumption) can be determined using a recursive technique that links thermal mass over adjacent time periods within the building (208). The temperature of the building for the time period at issue (e.g., daily energy consumption) can then be determined using the coefficients and the recursively determined intrinsic thermal mass (208) using a recursive technique that accounts for links over adjacent time periods within the building (210).

For example, computation of $T_{rm,avg}$ in equation [1] is used in the daily heating balance equation for heating uses knowledge of $T_{rm}$ and $T_{TMint}$, in which $T_{TMint}$ is the temperature of the intrinsic thermal mass in a building. The coupled differential equations for determining these two variables are shown below as equations [2a]-[2b]. These equations are converted to numerical form and can be applied during times when $T_{rm}$ is elevated above the heating set point. The basic, interactive differential equations for $T_{rm}$ and $T_{TMint}$ are:

$$(mC_p)_{air} dT_{rm}/dt = -(UA)_{tot} \cdot (T_{rm} - T_{amb}) + h_i A_{TMint} \cdot (T_{TMint} - T_{rm}) + S^*_{rm} - V_H \quad [2a]$$

$$(mC_p)_{TMint} dT_{TMint}/dt = -h_i A_{TMint} \cdot (T_{TMint} - T_{rm}) + S^*_{TMint} \quad [2b]$$

in which $(mC_p)_{air}$ is the thermal mass (a measure of heat capacitance) of air; $(mC_p)_{TMint}$ is the thermal mass of the intrinsic mass; $A_{TMint}$ is the composite surface area of the intrinsic mass; $h_i$ is the coefficient of convective heat transfer between room air and the intrinsic thermal mass; $S^*_{rm}$ represents the solar gains directly to the room air through windows and walls, plus internal gains; and $S^*_{TMint}$ represents the passive solar gains directly to the intrinsic thermal mass. As described above, equations [2a] and [2b] can computationally expensive (e.g., require large number of CPU cycles and/or memory) and may not be suitable for real time or runtime use.

The differential equations [2a] and [2b] are integrated over a discrete time step, $\Delta t$, and converted to the following set of recursive numerical algorithms that can provide more efficient solution for determining $T_{rm}$ and $T_{TMint}$:

$$T_{rm,i+1} = F_1 \cdot T_{rm,i} + F_2 \cdot T_{amb,avg} + F_3 \cdot T_{TMint,i} + F_4 \cdot S^*_{TMint,avg} + F_5 \cdot S^*_{rm,avg} \quad [3a]$$

$$T_{TMint,i+1} = G_1 \cdot T_{TMint,i} + G_2 \cdot T_{amb,avg} + G_3 \cdot T_{rm,i} + G_4 \cdot S^*_{rm,avg} + G_5 \cdot S^*_{TMint,avg} \quad [3b]$$

in which certain terms are denoted, by subscripts, as averages over the time step, $\Delta t$. The indices i and i+1 correspond to the start and end of a computational time step, respectively. The equation [3a] is an example technique that can be used for step 210 and the equation [3b] is an example technique that can be used for step 208. The coefficients F and G, with exceptions described later, are computed only once for each longer period simulation (e.g., annual simulation), which makes for highly efficient computation. The coefficients are as follows:

a) $F_1=D'_1/D_1$, where $D_1=1-(A_3 \cdot A_3)/(B_1 \cdot A_1)$ and $D'_1=A'_1/A_1+(A_3 \cdot A_3)/(B_1 \cdot A_1)$, in which $A_1=(mC_p)_{air}/\Delta t+(UA)_{tot}/2+h_i A_{TMint}/2$, $B_1=(mC_p)_{TMint}/\Delta t+h_i \cdot A_{TMint}/2$, $B'_1=(mC_p)_{TMintr}/\Delta t-h_i \cdot A_{TMint}/2$, and $A_3=h_i \cdot A_{TMint}/2$ b) $F_2=(UA)_{tot}/(A_1 \cdot D_1)$ c) $F_3=(B'_1/B_1+1) \cdot A_3/(A_1 \cdot D_1)$ d) $F_4=G_4=A_3/(A_1 \cdot B_1 \cdot D_1)$ e) $F_5=1/(A_1 \cdot D_1)$ f) $G_1=D'_2/D_1$, where $D'_2=B'_1/B_1+(A_3 \cdot A_3)/(B_1 \cdot A_1)$ g) $G_2=A_3 \cdot (UA)_{tot}/(A_1 \cdot B_1 \cdot D_1)$ h) $G_3=(A'_1/A_1+1) \cdot A_3/(B_1 \cdot D_1)$, where $A'_1=(mC_p)_{air}/\Delta t-(UA)_{tot}/2-h_i A_{TMint}/2$ i) $G_4=F_4$ (previously defined)

j) $G_5=1/(B_1 \cdot D_1)$

Figure 5:
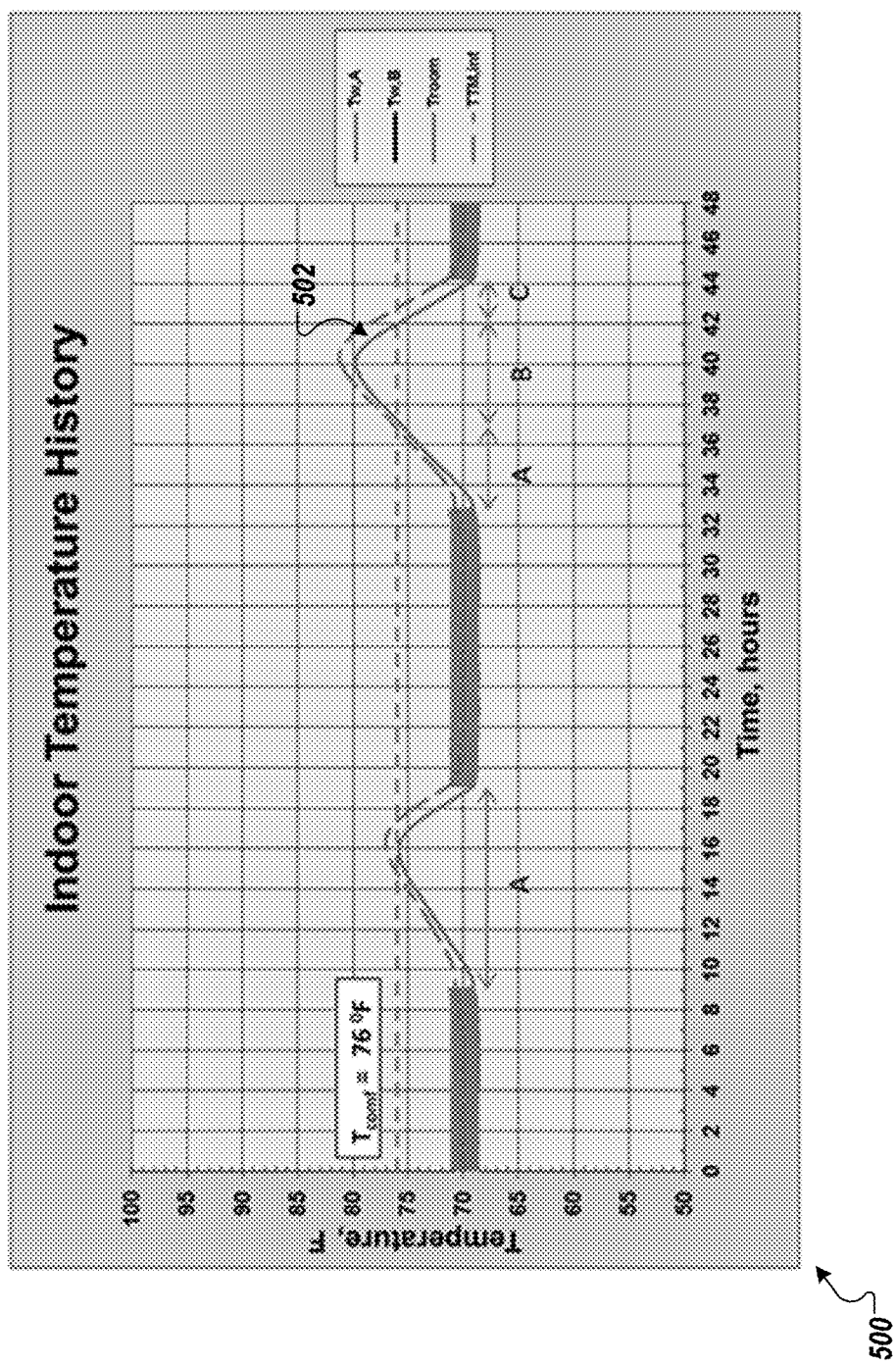
FIG. 5 is a graph of an example simulation.

The $V_H$ term in Eq. [2a] is absent in Eqns. [3a] and [3b], because each shorter time period (e.g., day) of a longer time period simulation (e.g., annual simulation) is performed first with no assumed window shading or venting to determine the degree and extent to which wintertime over-heating may occur due to passive solar gain. Once the incidence of over-heating is calculated for a given shorter time period (e.g., day), a second simulation is run for the portion of the time period (e.g., day) for which overheating occurred to explore venting or shading strategies to maintain thermal comfort. In the second simulation, the $V_H$ term is incorporated in a modified version of the numerical algorithms. Statistics for the entire heating season can be compiled for each longer time period simulation (e.g., annual simulation) to show the percentages of days that over heat and the degree of venting or shading needed for thermal comfort. For example, FIG. 5 shows a two-day simulation in which the room temperature exceeds the 76° F. comfort limit for about 4½ hours (502) on the second day—an example of overheating caused by, for example, solar load during the day.

Referring back to FIG. 2, heat/energy gains for the building can be identified (212). For example, heat/energy gains can include the total daily heat gains into the building (S*) and/or other energy gains. Heat/energy losses for the building can also be identified (214). For example, heat/energy losses can include energy losses from venting ($V_H$), energy losses associated with fan power to deliver heat to the room ($E_{fan}$), energy losses associated with HVAC equipment cycling ($L_{cycling}$), and/or other energy losses. Changes in the stored thermal mass in the building over the time period at issue (e.g., day) can be identified (216). For example, the difference in thermal storage in thermal mass from the beginning to end of a day (Stor1) can be determined. Excess thermal mass stored from a previous time period (e.g., day) can be identified (218). For example, excess thermal mass from the previous day that will offset heating load for the current day can be identified (Stor2).

As indicated by step 220, the heating balance for the building for the time period at issue (e.g., day) can be determined using the parameters (206), the recursively determined building temperature (210), heat gains (212), heat losses (214), stored thermal mass (216), and/or excess thermal mass (218). For example, the equation [1] can be used to determine the daily heating balance for the building.

Once the heating balance for the building has been determined, a determination can be made as to whether the coefficients should continue to be used without recalculation (222). For example, as described above, the technique 200 can permit for the coefficients (e.g., F and G) to be calculated once over a longer period of time and then reused for simulations within that longer time period without recalculation. If the end of the recalculation time period (e.g., annual) has not yet been reached, then the determination at step 222 can be "no" and the technique can repeat the steps 204-222 without recalculating the coefficients. If the end of the recalculation time period has been reached, then determination at step 222 can be "yes" and the technique can repeat step 202, followed by steps 204-222.

Figure 3:
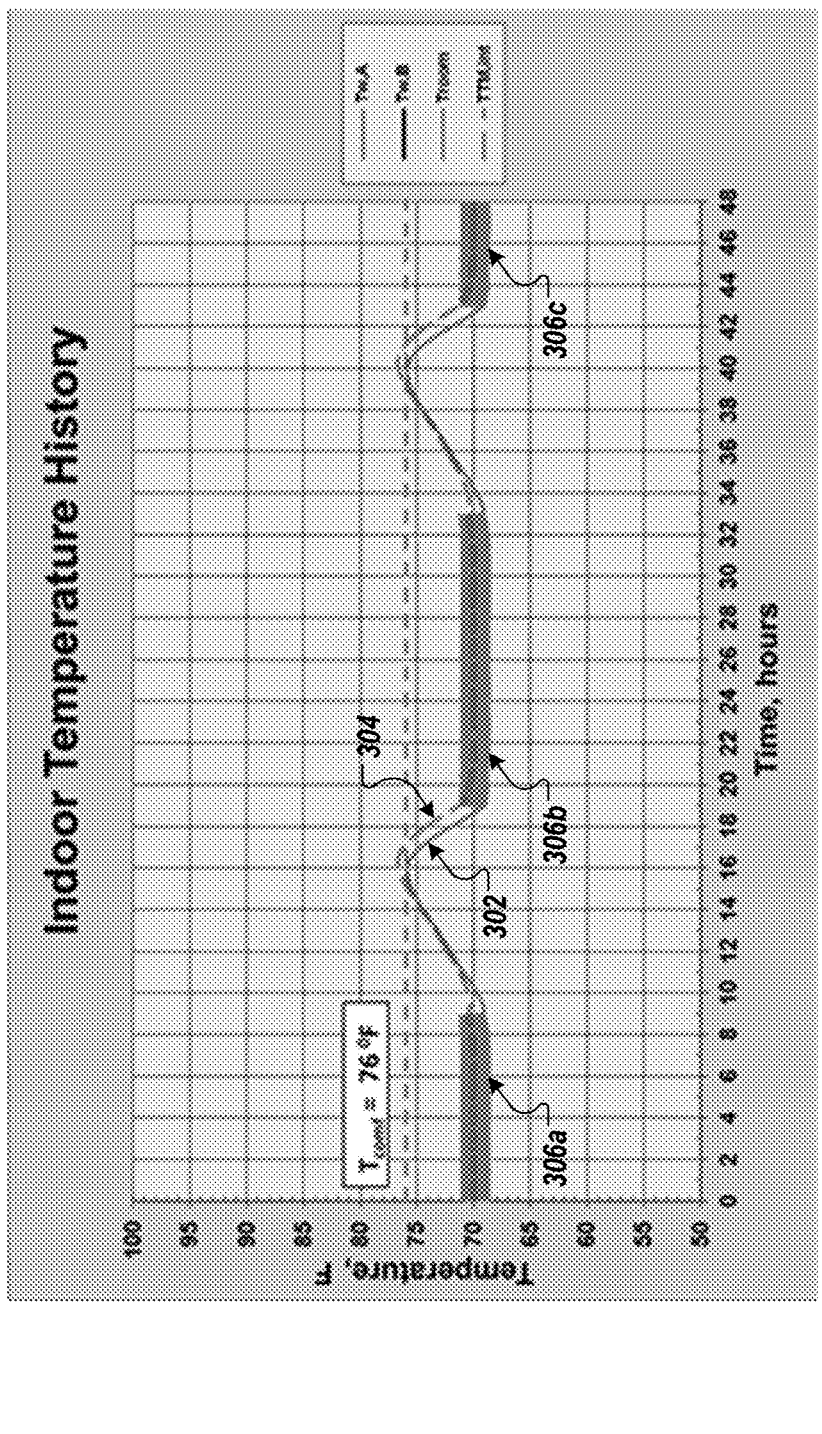
FIG. 3 is a graph of an example indoor temperature history for heating.

Referring to FIG. 3, a graph 300 of an example indoor temperature history for the heating season is shown, which can be used to illustrate the computation of $T_{rm}$. As shown in FIG. 3, for example, room temperature is plotted over a two-day period as a function of passive solar gains that heat up an interior zone. The temperature history graph 300 displays room air temperature 302 ($T_{rm}$) and temperature, $T_{TMint}$, of intrinsic mass 304 in house interior. Generally, $T_{TMint}$ 304 tends to run higher during daytime than $T_{rm}$ 302 due to direct impact of solar gains. Generally, heat from the intrinsic mass heats the room air. The parameters Tw,A and Tw,B correspond to added masonry walls or floors for thermal mass storage, of which there was none in this case. The blue bands 306a-c shown for room temperature are a manifestation of HVAC cycling around the temperature set point of 70° F. The temperature oscillations are in the dead band, which is typically ±1° F.

Figure 4A:
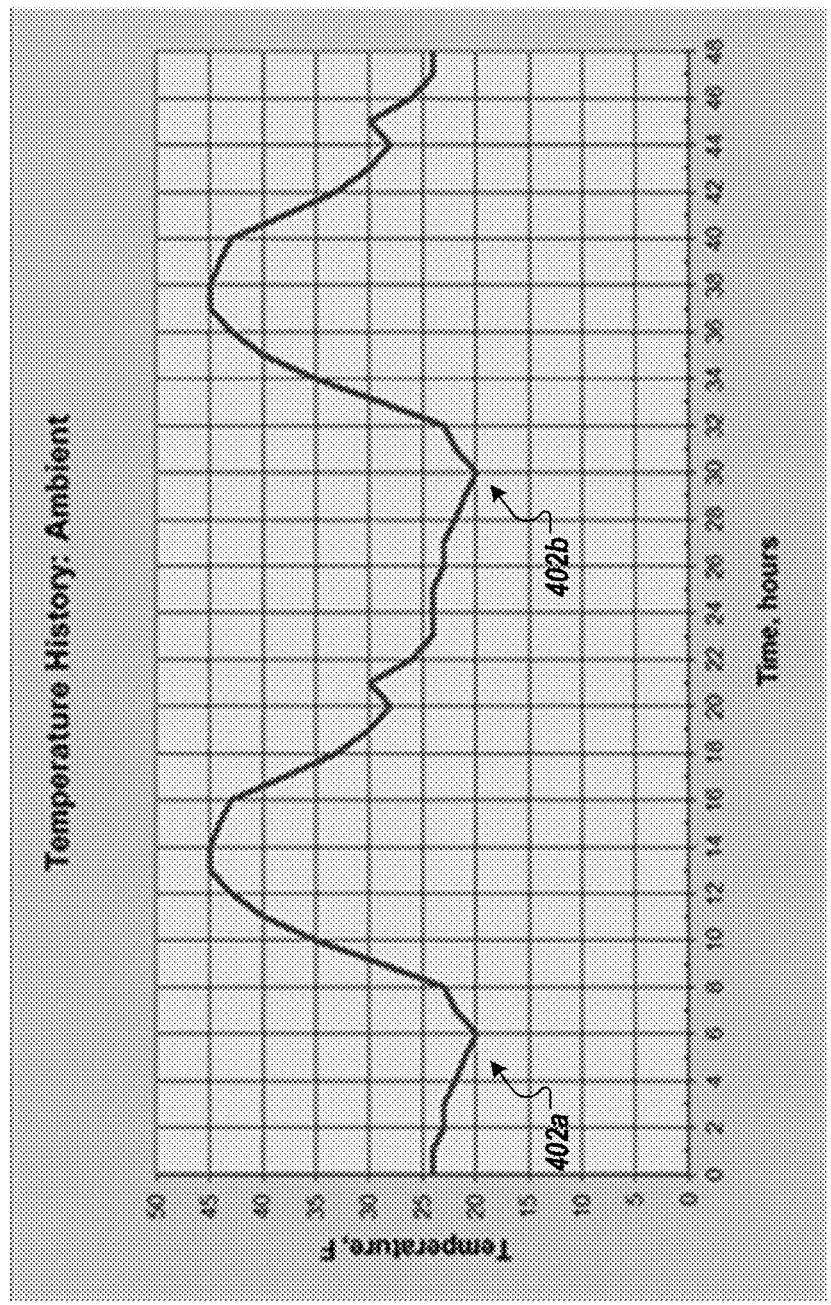
FIGS. 4A and 4B are graphs of an example of weather data that may affect building thermal performance.
Figure 4B:
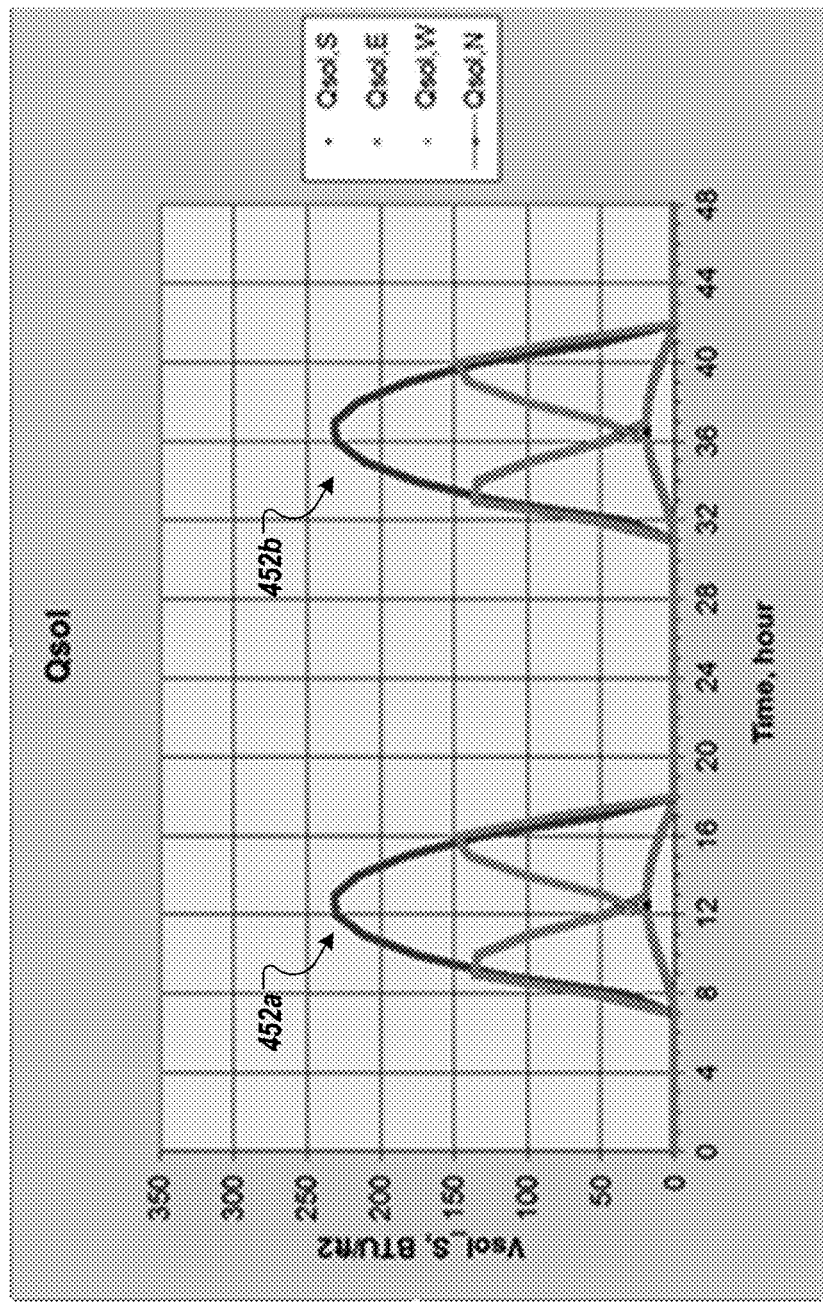

FIGS. 4A and 4B show respective graphs 400 and 450 of an example of weather data that may affect building thermal performance. As shown in FIG. 3, for example, passive solar gains (in addition to internal gains) may drive the wintertime room temperature to near the ASHRAE limit for thermal comfort of 76° F. If that limit is exceeded, for example, either solar control (e.g. shading curtains) or venting can be used to maintain comfort. The energy design and rating system 100, using the example technique 200, for example, can provide a user with information on the number and duration of daily incidences of overheating in the heating season if no mitigation strategies are applied, and what strategies will yield the best overall performance for energy savings and occupant thermal comfort on a daily and annual basis.

Referring to FIG. 4A, for example, a graph 400 is shown of an outdoor (ambient) temperature profile for a simulation of $T_{rm}$ and $T_{TMint}$ (shown in FIG. 3). For example, the graph 400 displays data related to two moderately cold days, dipping down to rather cold nights 402a-b.

Continuing the present example, FIG. 4B shows a graph 450 of solar insolation per unit area for south, east, west, and north orientations. For example, the graph 450 displays data indicating that the two days 452a-b are rather sunny, and the amounts of solar in the morning versus afternoon are quite symmetrical.

Referring again to FIG. 3, for example, it is apparent that the room temperature hovers around the set point of 70° F. and averages to 70° F. for all times when there are insufficient gains to raise the temperature. When the sun rises, for example, the room temperature elevates above the set point for several hours, and then decreases as solar gains diminish. The rate of temperature increase may depend on the amount of solar gains and internal gains and level of thermal mass, as well as losses of heat to the outdoors. In the present example, $(UA)_{tot}$ and $T_{amb}$ are relevant parameters. The rate of temperature decrease later in the day may depend on diminishing solar gains, heat storage in the thermal mass, and the parameters $(UA)_{tot}$ and $T_{amb}$.

The example computer-based technique 200 used for computation by the energy design and rating system 100 may include various aspects for improved efficiency and accuracy, as described above. Previous energy analysis software has been too simple and too complex at times, with the latter typically using brute force solution techniques and requiring large numbers of computational operation counts. The computer-based techniques described in this document allow for energy designs and ratings to be determined in a manner that is more efficient (fewer computational operations) and more accurate (more closely resemble and account for variables in heating/cooling).

In some implementations, to compute $T_{rm,avg}$ for use in the fundamental balance equation for heating, a computation of $T_{rm}$ may be performed only for times when total gains (solar and internal) exceed the building energy losses such that $T_{rm}$ floats upward, and then later downward to the set point at sunset when the HVAC starts to kick in. Techniques for calculating the float up of $T_{rm}$ are described below. The parameter $T_{rm,avg}$ may then be calculated from the various known and computed quantities on $T_{rm}$. In some implementations, $V_H$, $S^*$, and Stor1 and Stor2 may be efficiently computed. In some implementations, the parameters $L_{cycling}$ and $E_{fan}$ may be computed with correlation equations, thus providing vital information not available other than in very complex models that require long run times.

Computations may be sequenced by the computer-based energy design and rating system 100, for example, from one day to the next for all three hundred and sixty-five days corresponding to the weather data embodied in the standard TMY3 files. Days can be coupled by the "memory" contained in stored heat that remains at the end of each day in sequence. The Typical Meteorological Year (TMY3) files may be preprocessed to create customized input data files for use by the energy design and rating system. Other input mechanisms and file types can additionally and/or alternatively be used.

As described above as part of the example technique 200, computation of $T_{rm,avg}$ can be based at least in part on $T_{rm}$ and $T_{TMint}$, in which $T_{TMint}$ is the temperature of the intrinsic thermal mass in a building. Computing of $T_{rm}$ and $T_{TMint}$, for example, may include solving coupled differential equations (e.g., equations [2a]-[2b]) and may be applied only during times when $T_{rm}$ is elevated above the set point. The coupled differential equations can include parameters such as the thermal mass (a measure of heat capacitance) of air, the thermal mass of the intrinsic mass, the composite surface area of the intrinsic mass, the coefficient of convective heat transfer between room air and the intrinsic thermal mass, the solar gains directly to the room air through windows and walls, plus internal gains, and the passive solar gains directly to the intrinsic thermal mass. The differential equations can be integrated over a discrete time step, and converted to a set of recursive numerical algorithms that are employed by the energy design and rating system.

Each day of the heating season of an annual simulation can be performed first with no assumed venting or window shading to determine the degree and extent to which wintertime over-heating may occur. Once the incidence of over-heating is calculated for a given day, a second simulation can be run for that day to explore venting or shading strategies to maintain thermal comfort. In the second simulation, the $V_H$ term is incorporated in a modified version of the numerical algorithms. Statistics for the entire heating season can be compiled for each annual simulation to show the percentages of days that over heat and the degree of venting or shading needed for maintaining thermal comfort.

Referring to FIG. 5, a graph 500 of an example simulation is shown. In the present example, the energy design and rating system performs a two-day simulation in which the room temperature exceeds the 76° F. comfort limit for about 4½ hours (502) on the second day. For example, overheating may occur due to passive solar gains through windows. Tw,A and Tw,B, for example, correspond to added masonry walls or floors for thermal mass storage, of which there was none in this case. Developmental analysis of the numerical algorithms may reveal that time steps of half an hour should be used in the simulations to maintain high level numerical accuracy in computational results. Thus, relatively few computations may be performed using the present technique.

In the present example, calculation of $T_{rm}$ and $T_{TMint}$ for a given winter day begins when solar gains, in conjunction with internal gains, elevate $T_{rm}$ above the set point. This is indicated for two successive days, as shown by FIG. 5. For the first day, recursive numerical algorithms (e.g., equations [3a]-[3b]) can be applied for the complete range A (the entire duration of the first day—from hours 0-24). For the second day, the algorithms can be seamlessly applied for ranges A, B, and C initially to determine the degree to which overheating occurs (what is the peak value for $T_{rm}$) and for how long the upper comfort level of 76° F. is exceeded. Range A can be the time period from the start of the second day until the temperature exceeds the comfort level (hours 24-37), range B can be the time period during which the temperature is above the comfort level (hours 37-42), and range C can be the time period following the temperature returning below the comfort level (hours 42-48). A second run (and additional runs) of the simulation can then be performed for the day that overheats using modified settings for shading and venting for only the ranges B and C (not range A) to assess which potential venting and shading strategies will effective at keeping the temperature within the comfort level. In the present example, range A is unaffected by venting or shading, which only apply when $T_{rm}$ exceeds 76° F., and ranges B and C are affected by venting or shading.

To begin, the recursive numerical techniques (equations [3a]-[3b]) are computed at the start of Range A in FIG. 5, for example, using initial values corresponding to $T_{rm,i}$ and $T_{TMint,i}$, and appropriate values for $T_{amb,avg}$, $S^*_{rm,avg}$, and $S^*_{TMint,avg}$, which are averages over the computational time step, $\Delta t$. The time-averaged variables may be obtained from input data, for example. The calculations yield values for and $T_{TMint,i+1}$, which correspond to an advance in time of $\Delta t$. The computed values become the initial values for the next computation of the recursive numerical algorithms, advancing an additional time increment to a new time level. Appropriate values for the average quantities $T_{amb,avg}$, $S^*_{rm,avg}$, and $S^*_{TMint,avg}$ are inserted at each time step. This recursive process continues from when $T_{rm}$ first rises above the set point (start of range B) to when it later returns to the set point (start of range C), as shown in FIG. 5.

The time increment $\Delta t$, for example, may generally be equal to a time span of a half hour, but may be a fraction of a half hour to accommodate the fact that the starting or end points of ranges A or C may not correspond to the exact beginning or end of any given half hour of a day. The initial value for $T_{rm,i}$ at the start of range A in FIG. 5 can be the room set point minus the thermostatic dead band value, generally 1° F. Similarly, the initial value for $T_{TMint,i}$ can be the set point plus some fraction of the dead band value. For example, an appropriate choice for $T_{TMint,i}$ may be the set point, or the set point plus ½ the dead band value.

Figure 6:
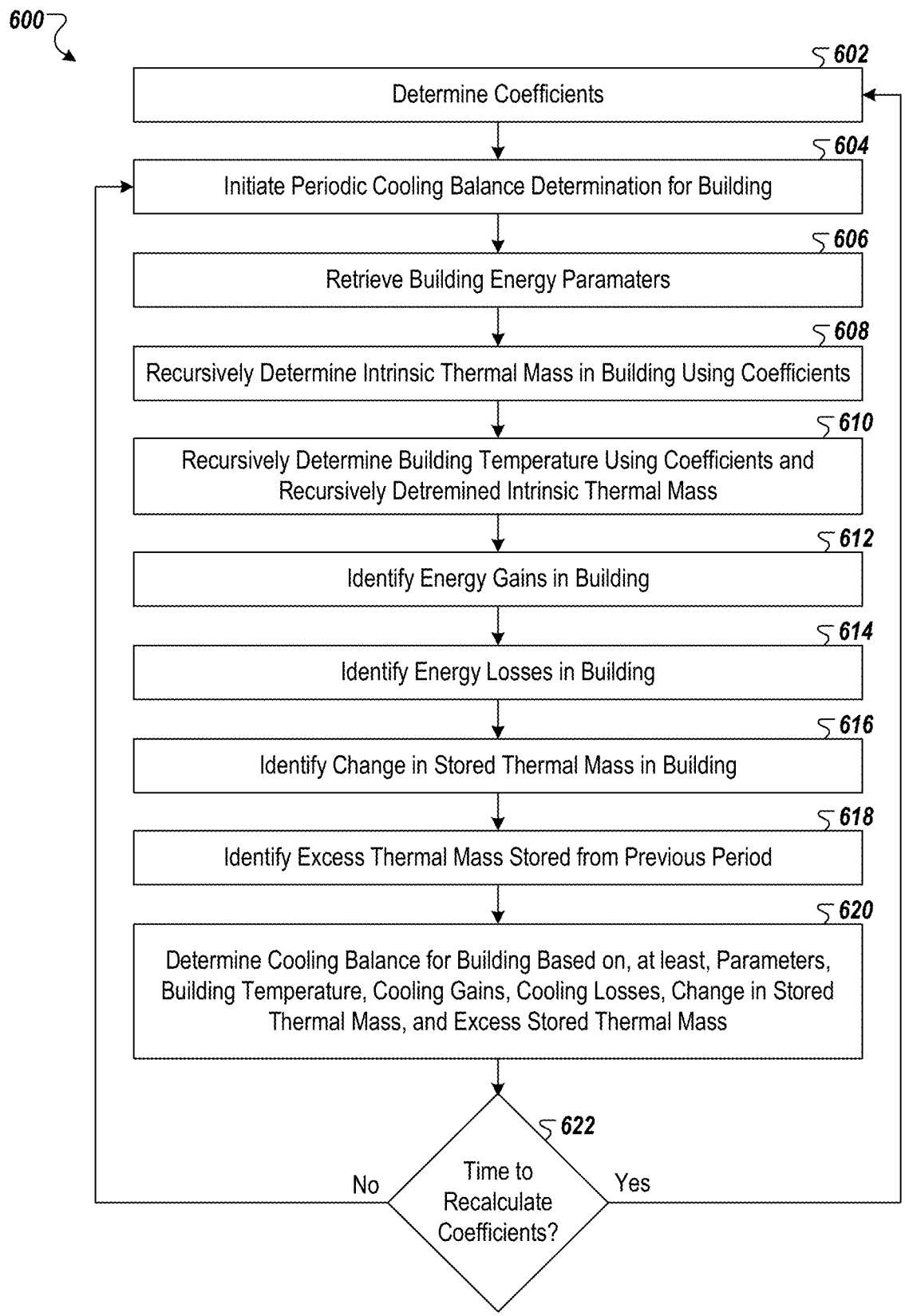
FIG. 6 is a flowchart of an example technique for determining cooling balance can be applied during periods when cooling would occur.

The fundamental balance equations and techniques (FIGS. 2-5) for heating and their application by the energy design and rating system (FIG. 1) are described above. Similarly, the energy design and rating system 100 may apply a fundamental balance equation and technique for cooling. For example, referring to FIG. 6, an example technique 600 for determining cooling balance can be applied during periods when cooling would occur, such as during summer. The example technique 600 can be used to simulate the periodic energy consumption for cooling and to explore venting or shading strategies to maintain thermal comfort within a building. The example technique 600 can be similar to the technique 200 described above with regard to FIG. 2, but can subtract (instead of add) some of the energy gains since they add to the cooling load and can add (instead of subtract) some of the energy losses since they subtract from the cooling load.

Like the example technique 200, the example technique 600 can account for thermal linkages between time periods (e.g., linkages between days), which can depend on, for example, the amount of thermal mass in a building and the amount of solar gains that thermally charge the mass in cooling scenarios. The technique 600 can account for the remaining thermal storage at the end of one day, which can compound the cooling needs of the subsequent day. For example, the intrinsic mass of a building (e.g., that which is embodied in the sheetrock walls and various furnishing elements) can be initially modeled, and then additional mass can be modeled, such as interior masonry walls and exposed masonry floors, and phase change wall and ceiling materials. The technique 600 can take into consideration of variety of factors, such as space heating and cooling, energy use due to household appliances, hot water heating, domestic water usage, and lighting, which depend on the number of occupants in a home and not the building elements that affect heating or cooling.

Accurately accounting for energy storage over periods of time (e.g., between days), including the intrinsic thermal storage of a building, can be computationally intensive, as described above with regard to differential equations [5a]-[5b]. In contrast, the example technique 600 accounts for energy storage and linkages between time periods in a way that is less computationally intensive and that uses fewer computational resources (e.g., use fewer CPU cycles, use less memory) so as to permit, for example, use of the technique 600 in real time (similar to the technique 200). For example, the technique 600 can determine coefficients on a second periodic basis (e.g., annually) that is longer than a first period (e.g., daily) for determining the periodic cooling balance for a building. The coefficients can be computed, stored, and then repeatedly used in recursive equations (e.g., equations [6a]-[6b]) during the longer period of time to approximate energy linkages within a building, yet while still providing results that are substantially as accurate as the calculations performed without approximation (e.g., differential equations [5a]-[5b]). By using the technique 600, cooling balances for a building can be efficiently and accurately simulated, which can provide any of a variety of advantages. For example, such efficient and accurate techniques can permit periodic cooling balances to be determined more frequently (e.g., determined on a daily basis instead of annually) and to be used in a variety of non-conventional computing platforms and contexts, such as being used for real time calculations by a server system (e.g., cloud based server system) in response to client requests for such calculations.

Similar to 202, coefficients can be initially determined (602) and then repeatedly used without recalculation during simulations to determine periodic cooling balances for a building. For example, coefficients can be determined annually for a building and then used throughout the year to approximate cooling balances for the building. Coefficients can be determined for use in recursive equations that can approximate and model cooling balances and linkages across periods of time (e.g., approximate stored intrinsic mass). Example coefficients and recursive equations are described below with regard to equations [6a]-[6b]. Such approximations can be highly accurate and can be substantially the same as non-approximated calculations, for example, determined using example differential equations [5a]-[5b].

A periodic cooling balance determination for the building can be initiated (604). The periodic cooling balance for the building can be determined across any of a variety of periods of time, such as 1 hour, 6 hours, 12 hours, 1 day, 2 days, 3 days, 1 week, 1 month, and/or other periods of time. For example, the periodic cooling balance can be a daily cooling balance that is determined using the following equation:

$$Q_C = \{24(UA)_{tot} \times (T_{rm,avg} - T_{amb,avg}) + S^* - V_C + \text{Stor1}\}/COP_{ss} + L_{cycling} + E_{fan} + \text{Stor2} \quad [4]$$

in which $Q_C$ is the daily energy consumption for cooling;

$(UA)_{tot}$ is the total building load coefficient, as previously defined;

$T_{rm,avg}$ is the daily average room temperature, as previously defined;

$T_{amb,avg}$ is the daily average ambient (outdoor) temperature, as previously defined;

S* is the total daily energy gains into the building (solar gains through windows, solar gains through walls and roof as a function of exterior color, hence ability to absorb energy, and internal gains due to appliances and people), as defined previously;

$V_C$ is the beneficial energy loss from venting to lower summertime mechanical cooling due to solar gains;

Stor1 is the difference in thermal storage in thermal mass from the beginning to end of a day, as previously defined;

Stor2 is the excess of stored energy available from the previous day that adds to the cooling load of the current day;

$E_{fan}$ represents energy losses associated with fan power to deliver cooling to the room space;

$L_{cycling}$ represents energy losses associated with HVAC equipment cycling; and $COP_{ss}$ is the steady state efficiency of the HVAC cooling equipment.

The differential equations and recursive numerical equations for $T_{rm}$ and $T_{TMint}$ for the cooling season are described below with regard to equations [5a]-[5b] and [6a]-[6b], which are similar to [2a]-[2b] and [3a]-[3b] except that the term $V_H$ is replaced by $V_C$.

As part of determining the periodic energy consumption for cooling (e.g., daily energy consumption for cooling—$Q_C$), building energy and other parameters (e.g., weather parameters) can be retrieved (206), such as the total building load coefficient ($(UA)_{tot}$), the steady state efficiency of the HVAC equipment ($\eta_{ss}$), and the ambient weather ($T_{amb}$). For example, the parameter $(UA)_{tot}$ can be computed using the UA of each envelop element of the building. Envelop elements can be selected inputs by the user to represent composite thermal insulation values for walls, the roof, foundation, windows, infiltration (air leakage), and so forth. The parameter $\eta_{ss}$ (or COP) can be specified for each particular HVAC mechanical equipment device. The parameter $T_{amb}$ can be determined from weather data.

Using the coefficients previously determined for a longer period of time (e.g., determined for annual simulations), the temperature of the intrinsic thermal mass in the building for the time period at issue (e.g., daily energy consumption) can be determined using a recursive technique that links thermal mass over adjacent time periods within the building (208).

The temperature of the building for the time period at issue (e.g., daily energy consumption) can then be determined using the coefficients and the recursively determined intrinsic thermal mass (208) using a recursive technique that accounts for links over adjacent time periods within the building (210).

For example, computation of $T_{rm,avg}$ in equation [4] is used in the daily cooling balance equation for cooling uses knowledge of $T_{rm}$ and $T_{TMint}$, in which $T_{TMint}$ is the temperature of the intrinsic thermal mass in a building. The coupled differential equations for determining these two variables are shown below as equations [5a]-[5b]. These equations are converted to numerical form and can be applied during times when $T_{rm}$ is elevated above the cooling set point. The basic, interactive differential equations for $T_{rm}$ and $T_{TMint}$ are:

$$(mC_p)_{air} dT_{rm}/dt = -(UA)_{tot}\cdot(T_{rm}-T_{amb}) + h_i A_{TMint} \cdot (T_{TMint}-T_{rm}) + S^*_{rm} - V_C \quad [5a]$$

$$(mC_p)_{TMint} dT_{TMint}/dt = -h_i A_{TMint}\cdot(T_{TMint}-T_{rm}) + S^*_{TMint} \quad [5b]$$

in which $(mC_p)_{air}$ is the thermal mass (a measure of heat capacitance) of air; $(mC_p)_{TMint}$ is the thermal mass of the intrinsic mass; $A_{TMint}$ is the composite surface area of the intrinsic mass; $h_i$ is the coefficient of convective heat transfer between room air and the intrinsic thermal mass; $S^*_{rm}$ represents the solar gains directly to the room air through windows and walls, plus internal gains; and $S^*_{TMint}$ represents the passive solar gains directly to the intrinsic thermal mass. As described above, equations [5a] and [5b] can computationally expensive (e.g., require large number of CPU cycles and/or memory) and may not be suitable for real time or runtime use.

The differential equations [5a] and [5b] are integrated over a discrete time step, $\Delta t$, and converted to the following set of recursive numerical algorithms that can provide more efficient solution for determining $T_{rm}$ and $T_{TMint}$:

$$T_{rm,i+1} = F_1 \cdot T_{rm,i} + F_2 \cdot T_{amb,avg} + F_3 \cdot T_{TMint,i} + F_4 \cdot S^*_{TMint,avg} + F_5 \cdot S^*_{rm,avg} \quad [6a]$$

$$T_{TMint,i+1} = G_1 \cdot T_{TMint,i} + G_2 \cdot T_{amb,avg} + G_3 \cdot T_{rm,i} + G_4 \cdot S^*_{rm,avg} + G_5 \cdot S^*_{TMint,avg} \quad [6b]$$

in which certain terms are denoted, by subscripts, as averages over the time step, $\Delta t$. The indices i and i+1 correspond to the start and end of a computational time step, respectively. The equation [6a] is an example technique that can be used for step 610 and the equation [6b] is an example technique that can be used for step 608. The coefficients F and G, with exceptions described later, are computed only once for each longer period simulation (e.g., annual simulation), which makes for highly efficient computation. The coefficients are as follows:

k) $F_1 = D'_1/D_1$, where $D_1 = 1 - (A_3 \cdot A_3)/(B_1 \cdot A_1)$ and $D'_1 = A'_1/A_1 + (A_3 \cdot A_3)/(B_1 \cdot A_1)$, in which $A_1 = (mC_p)_{air}/\Delta t + (UA)_{tot}/2 + h_i A_{TMint}/2$, $B_1 = (mC_p)_{TMint}/\Delta t + h_i \cdot A_{TMint}/2$, $B'_1 = (mC_p)_{TMint}/\Delta t - h_i \cdot A_{TMint}/2$, and $A_3 = h_i \cdot A_{TMint}/2$ l) $F_2 = (UA)_{tot}/(A_1 \cdot D_1)$ m) $F_3 = (B'_1/B_1 + 1) \cdot A_3/(A_1 \cdot D_1)$ n) $F_4 = G_4 = A_3/(A_1 \cdot B_1 \cdot D_1)$ o) $F_5 = 1/(A_1 \cdot D_1)$ p) $G_1 = D'_2/D_1$, where $D'_2 = B'_1/B_1 + (A_3 \cdot A_3)/(B_1 \cdot A_1)$ q) $G_2 = A_3 \cdot (UA)_{tot}/(A_1 \cdot B_1 \cdot D_1)$ r) $G_3 = (A'_1/A_1 + 1) \cdot A_3/(B_1 \cdot D_1)$, where $A'_1 = (mC_p)_{air}/\Delta t - (UA)_{tot}/2 - h_i A_{TMint}/2$ s) $G_4 = F_4$ (previously defined)

t) $G_5 = 1/(B_1 \cdot D_1)$

The $V_C$ term in Eq. [5a] is absent in Eqns. [6a] and [6b], because each shorter time period (e.g., day) of a longer time period simulation (e.g., annual simulation) is performed first with no assumed window shading or venting to determine the degree and extent to which summertime over-heating may occur due to passive solar gain. Once the incidence of over-heating is calculated for a given shorter time period (e.g., day), a second simulation is run for the portion of the time period (e.g., day) for which overheating occurred to explore venting or shading strategies to maintain thermal comfort. In the second simulation, the $V_C$ term is incorporated in a modified version of the numerical algorithms. Statistics for the entire cooling season can be compiled for each longer time period simulation (e.g., annual simulation) to show the percentages of days that over heat and the degree of venting or shading needed for thermal comfort.

Referring back to FIG. 6, energy gains for the building can be identified (612). For example, energy gains can include the total daily energy gains into the building (S*) and/or other energy gains. Energy losses for the building can also be identified (614). For example, energy losses can include energy losses from venting ($V_C$), energy losses associated with fan power to deliver cooling to the room ($E_{fan}$), energy losses associated with HVAC equipment cycling ($L_{cycling}$), and/or other energy losses. Changes in the stored thermal mass in the building over the time period at issue (e.g., day) can be identified (616). For example, the difference in thermal storage in thermal mass from the beginning to end of a day (Stor1) can be determined. Excess thermal mass stored from a previous time period (e.g., day) can be identified (618). For example, excess thermal mass from the previous day that will offset cooling load for the current day can be identified (Stor2).

As indicated by step 620, the cooling balance for the building for the time period at issue (e.g., day) can be determined using the parameters (606), the recursively determined building temperature (610), energy gains (612), energy losses (614), stored thermal mass (616), and/or excess thermal mass (618). For example, the equation [4] can be used to determine the daily cooling balance for the building.

Once the cooling balance for the building has been determined, a determination can be made as to whether the coefficients should continue to be used without recalculation (622). For example, as described above, the technique 600 can permit for the coefficients (e.g., F and G) to be calculated once over a longer period of time and then reused for simulations within that longer time period without recalculation. If the end of the recalculation time period (e.g., annual) has not yet been reached, then the determination at step 622 can be "no" and the technique can repeat the steps 604-622 without recalculating the coefficients. If the end of the recalculation time period has been reached, then determination at step 622 can be "yes" and the technique can repeat step 602, followed by steps 604-622.

Computing devices and computer systems described in this document that may be used to implement the systems, techniques, machines, and/or apparatuses can operate as clients and/or servers, and can include one or more of a variety of appropriate computing devices, such as laptops, desktops, workstations, servers, blade servers, mainframes, mobile computing devices (e.g., PDAs, cellular telephones, smartphones, and/or other similar computing devices), computer storage devices (e.g., Universal Serial Bus (USB) flash drives, RFID storage devices, solid state hard drives, hard-disc storage devices), and/or other similar computing devices. For example, USB flash drives may store operating systems and other applications, and can include input/output components, such as wireless transmitters and/or USB connector that may be inserted into a USB port of another computing device.

Such computing devices may include one or more of the following components: processors, memory (e.g., random access memory (RAM) and/or other forms of volatile memory), storage devices (e.g., solid-state hard drive, hard disc drive, and/or other forms of non-volatile memory), high-speed interfaces connecting various components to each other (e.g., connecting one or more processors to memory and/or to high-speed expansion ports), and/or low speed interfaces connecting various components to each other (e.g., connecting one or more processors to a low speed bus and/or storage devices). Such components can be interconnected using various busses, and may be mounted across one or more motherboards that are communicatively connected to each other, or in other appropriate manners. In some implementations, computing devices can include pluralities of the components listed above, including a plurality of processors, a plurality of memories, a plurality of types of memories, a plurality of storage devices, and/or a plurality of buses. A plurality of computing devices can be connected to each other and can coordinate at least a portion of their computing resources to perform one or more operations, such as providing a multi-processor computer system, a computer server system, and/or a cloud-based computer system.

Processors can process instructions for execution within computing devices, including instructions stored in memory and/or on storage devices. Such processing of instructions can cause various operations to be performed, including causing visual, audible, and/or haptic information to be output by one or more input/output devices, such as a display that is configured to output graphical information, such as a graphical user interface (GUI). Processors can be implemented as a chipset of chips that include separate and/or multiple analog and digital processors. Processors may be implemented using any of a number of architectures, such as a CISC (Complex Instruction Set Computers) processor architecture, a RISC (Reduced Instruction Set Computer) processor architecture, and/or a MISC (Minimal Instruction Set Computer) processor architecture. Processors may provide, for example, coordination of other components computing devices, such as control of user interfaces, applications that are run by the devices, and wireless communication by the devices.

Memory can store information within computing devices, including instructions to be executed by one or more processors. Memory can include a volatile memory unit or units, such as synchronous RAM (e.g., double data rate synchronous dynamic random access memory (DDR SDRAM), DDR2 SDRAM, DDR3 SDRAM, DDR4 SDRAM), asynchronous RAM (e.g., fast page mode dynamic RAM (FPM DRAM), extended data out DRAM (EDO DRAM)), graphics RAM (e.g., graphics DDR4 (GDDR4), GDDR5). In some implementations, memory can include a non-volatile memory unit or units (e.g., flash memory). Memory can also be another form of computer-readable medium, such as magnetic and/or optical disks.

Storage devices can be capable of providing mass storage for computing devices and can include a computer-readable medium, such as a floppy disk device, a hard disk device, an optical disk device, a Microdrive, or a tape device, a flash memory or other similar solid state memory device, or an array of devices, including devices in a storage area network or other configurations. Computer program products can be tangibly embodied in an information carrier, such as memory, storage devices, cache memory within a processor, and/or other appropriate computer-readable medium. Computer program products may also contain instructions that, when executed by one or more computing devices, perform one or more methods or techniques, such as those described above.

High speed controllers can manage bandwidth-intensive operations for computing devices, while the low speed controllers can manage lower bandwidth-intensive operations. Such allocation of functions is exemplary only. In some implementations, a high-speed controller is coupled to memory, display (e.g., through a graphics processor or accelerator), and to high-speed expansion ports, which may accept various expansion cards; and a low-speed controller is coupled to one or more storage devices and low-speed expansion ports, which may include various communication ports (e.g., USB, Bluetooth, Ethernet, wireless Ethernet) that may be coupled to one or more input/output devices, such as keyboards, pointing devices (e.g., mouse, touchpad, track ball), printers, scanners, copiers, digital cameras, microphones, displays, haptic devices, and/or networking devices such as switches and/or routers (e.g., through a network adapter).

Displays may include any of a variety of appropriate display devices, such as TFT (Thin-Film-Transistor Liquid Crystal Display) displays, OLED (Organic Light Emitting Diode) displays, touchscreen devices, presence sensing display devices, and/or other appropriate display technology. Displays can be coupled to appropriate circuitry for driving the displays to output graphical and other information to a user.

Expansion memory may also be provided and connected to computing devices through one or more expansion interfaces, which may include, for example, a SIMM (Single In Line Memory Module) card interfaces. Such expansion memory may provide extra storage space for computing devices and/or may store applications or other information that is accessible by computing devices. For example, expansion memory may include instructions to carry out and/or supplement the techniques described above, and/or may include secure information (e.g., expansion memory may include a security module and may be programmed with instructions that permit secure use on a computing device).

Computing devices may communicate wirelessly through one or more communication interfaces, which may include digital signal processing circuitry when appropriate. Communication interfaces may provide for communications under various modes or protocols, such as GSM voice calls, messaging protocols (e.g., SMS, EMS, or MMS messaging), CDMA, TDMA, PDC, WCDMA, CDMA2000, GPRS, 4G protocols (e.g., 4G LTE), and/or other appropriate protocols. Such communication may occur, for example, through one or more radio-frequency transceivers. In addition, short-range communication may occur, such as using a Bluetooth, Wi-Fi, or other such transceivers. In addition, a GPS (Global Positioning System) receiver module may provide additional navigation- and location-related wireless data to computing devices, which may be used as appropriate by applications running on computing devices.

Computing devices may also communicate audibly using one or more audio codecs, which may receive spoken information from a user and convert it to usable digital information. Such audio codecs may additionally generate audible sound for a user, such as through one or more speakers that are part of or connected to a computing device.

Such sound may include sound from voice telephone calls, may include recorded sound (e.g., voice messages, music files, etc.), and may also include sound generated by applications operating on computing devices.

Various implementations of the systems, devices, and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications, or code) can include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor.

To provide for interaction with a user, the systems and techniques described here can be implemented on a computer having a display device (e.g., LCD display screen, LED display screen) for displaying information to users, a keyboard, and a pointing device (e.g., a mouse, a trackball, touchscreen) by which the user can provide input to the computer. Other kinds of devices can be used to provide for interaction with a user as well; for example, feedback provided to the user can be any form of sensory feedback (e.g., visual feedback, auditory feedback, and/or tactile feedback); and input from the user can be received in any form, including acoustic, speech, and/or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

The above description provides examples of some implementations. Other implementations that are not explicitly described above are also possible, such as implementations based on modifications and/or variations of the features described above. For example, the techniques described above may be implemented in different orders, with the inclusion of one or more additional steps, and/or with the exclusion of one or more of the identified steps. Additionally, the steps and techniques described above as being performed by some computing devices and/or systems may alternatively, or additionally, be performed by other computing devices and/or systems that are described above or other computing devices and/or systems that are not explicitly described. Similarly, the systems, devices, and apparatuses may include one or more additional features, may exclude one or more of the identified features, and/or include the identified features combined in a different way than presented above. Features that are described as singular may be implemented as a plurality of such features. Likewise, features that are described as a plurality may be implemented as singular instances of such features. The drawings are intended to be illustrative and may not precisely depict some implementations. Variations in sizing, placement, shapes, angles, and/or the positioning of features relative to each other are possible.

What is claimed is:

1. A method for more efficiently determining an energy consumption metric for a building over a time period, the method comprising:
    determining, by a computer system, coefficients that approximate differential equations for determining (i) air temperature in the building and (ii) temperature of intrinsic thermal mass in the building, wherein the time period includes a plurality of days and the coefficients are determined once for the time period;
    retrieving, by the computer system, energy parameters for the building and weather data for the building;
    recursively determining, by the computer system and using a first recursive equation and the coefficients, the temperature of the intrinsic thermal mass for the building over the plurality of days;
    recursively determining, by the computer system and using a second recursive equation and the coefficients, the air temperature for the building over the plurality of days, wherein the first and second recursive equations are different from the differential equations;
    determining, by the computer system and using an energy balance equation, the energy consumption metric for the building based, at least in part, on (i) the energy parameters, (ii) the weather data, (iii) the temperature of the intrinsic thermal mass over the plurality of days, and (iv) the air temperature over the plurality of days; and
    outputting, by the computer system, the energy consumption metric.

2. The method of claim 1, further comprising:
    identifying, by the computer system, energy gains and energy losses in the building over the time period based on the energy parameters for the building and the weather data;
    wherein the energy consumption metric is further determined based on the energy gains and the energy losses in the building.

3. The method of claim 2, wherein the energy gains include:
    solar gains for the building, and
    internal gains due to one or more of: people, appliances, equipment, and other non-HVAC equipment generating heat within the building.

4. The method of claim 2, wherein the energy losses include:
first energy losses from to venting heat out of the building,
second energy losses from fan power to deliver heating or cooling from an HVAC unit throughout the building, and
third energy losses from cycling of the HVAC unit.

5. The method of claim 1, further comprising:
identifying, by the computer system, stored thermal mass in the building over the time period;
wherein the energy consumption metric is further determined based on the stored thermal mass in the building.

6. The method of claim 5, wherein the stored thermal mass is determined for each day in the plurality of days as a difference in the thermal mass from a beginning of the day to the end of the day.

7. The method of claim 1, further comprising:
identifying, by the computer system, excess stored energy in the building available to offset an HVAC load for the building from day to day across the time period;
wherein the energy consumption metric is further determined based on the excess stored energy in the building.

8. The method of claim 1, wherein the excess stored energy in the building is determined for each day in the plurality of days as an amount of stored energy available from a previous day to offset the HVAC load for the day.

9. The method of claim 1, wherein the energy parameters for the building include a total building load coefficient.

10. The method of claim 1, wherein the energy balance equation comprises a heating balance equation for the building that simulates energy consumption to heat the building within a predetermined temperature range over the time period.

11. The method of claim 1, wherein the energy balance equation comprises a cooling balance equation for the building that simulates energy consumption to cool the building within a predetermined temperature range over the time period.

12. The method of claim 1, wherein:
the first recursive equation determines the temperature of the intrinsic thermal mass for the building for each day in the time period based, at least in part, on the intrinsic thermal mass for the building for a previous day, and
the second recursive equation determines the air temperature for the building of each day in the time period based, at least in part, on the air temperature for the building for a previous day.

13. The method of claim 12, wherein:
the first recursive equation further determines the temperature of the intrinsic thermal mass for the building for each day in the time period based, at least in part, on the air temperature for the building for the previous day, and
the second recursive equation determines the air temperature for the building of each day in the time period based, at least in part, on the intrinsic thermal mass for the building for the previous day.

14. The method of claim 1, further comprising:
identifying, by the computer system, energy gains and energy losses in the building over the time period based on the energy parameters for the building and the weather data;
identifying, by the computer system, stored thermal mass in the building over the time period; and
identifying, by the computer system, excess stored energy in the building available to offset an HVAC load for the building from day to day across the time period;
wherein the energy consumption metric is further determined based on (i) the energy gains and the energy losses in the building, (ii) the stored thermal mass in the building, and (iii) the excess stored energy in the building;
wherein the energy gains include solar gains for the building and internal gains due to one or more of: people, appliances, equipment, and other non-HVAC equipment generating heat within the building;
wherein the energy losses include first energy losses from to venting heat out of the building, second energy losses from fan power to deliver heating or cooling from an HVAC unit throughout the building, and third energy losses from cycling of the HVAC unit;
wherein the stored thermal mass is determined for each day in the plurality of days as a difference in the thermal mass from a beginning of the day to the end of the day;
wherein the energy consumption metric is further determined based on the excess stored energy in the building;
wherein the excess stored energy in the building is determined for each day in the plurality of days as an amount of stored energy available from a previous day to offset the HVAC load for the day;
wherein the energy parameters for the building include a total building load coefficient;
wherein the first recursive equation determines the temperature of the intrinsic thermal mass for the building for each day in the time period based, at least in part, on the intrinsic thermal mass and the air temperature for the building for a previous day; and
wherein the second recursive equation determines the air temperature for the building of each day in the time period based, at least in part, on the air temperature and the intrinsic thermal mass for the building for a previous day.

15. The method of claim 1, further comprising:
identifying, by the computer system, portions of the time period during which the air temperature exceeds a threshold comfort level;
for each of the identified portions of the time period, repeatedly performing the following until appropriate adjustments are found to maintain the air temperature below the threshold comfort level:
varying, by the computer system, venting and shading options for the building during the portions of the time period; and
repeating the determination of the energy consumption metric for the building using the energy balance equation and the varied venting and shading options.

16. A computer system for more efficiently determining an energy consumption metric for a building over a time period, the system comprising:
an interface programmed to retrieve energy parameters for the building and weather data for the building;
one or more processors;
one or more storage devices storing instructions that, when executed, cause the one or more processors to perform operations including:
determining coefficients that approximate differential equations for determining (i) air temperature in the building and (ii) temperature of intrinsic thermal mass in the building, wherein the time period includes a plurality of days and the coefficients are determined once for the time period;

recursively determining, using a first recursive equation and the coefficients, the temperature of the intrinsic thermal mass for the building over the plurality of days;

recursively determining, using a second recursive equation and the coefficients, the air temperature for the building over the plurality of days, wherein the first and second recursive equations are different from the differential equations;

determining, using an energy balance equation, the energy consumption metric for the building based, at least in part, on (i) the energy parameters, (ii) the weather data, (iii) the temperature of the intrinsic thermal mass over the plurality of days, and (iv) the air temperature over the plurality of days; and outputting the energy consumption metric.

17. The computer system of claim 16, wherein:

the time period comprises a year, the energy consumption metric comprises energy consumption for the building over the year, and the energy consumption metric is a simulation determined (i) in runtime in response to a request for the energy consumption metric and (ii) using the coefficients and the recursive equations.

18. The computer system of claim 17, wherein:

the year starts on a current day and ends on a future date one year from the current day, and the energy consumption metric is determined in real time using current energy parameters and weather data for the building.

\* \* \* \* \*